United States Patent
Milane

(10) Patent No.: US 11,505,227 B2
(45) Date of Patent: Nov. 22, 2022

(54) DOLLY AND METHOD OF MANIPULATING SAME

(71) Applicant: Antoine Milane, Montreal (CA)

(72) Inventor: Antoine Milane, Montreal (CA)

( * ) Notice: Subject to any disclaimer, the term of this patent is extended or adjusted under 35 U.S.C. 154(b) by 948 days.

(21) Appl. No.: 16/279,037

(22) Filed: Feb. 19, 2019

(65) Prior Publication Data

US 2019/0256116 A1    Aug. 22, 2019

Related U.S. Application Data

(60) Provisional application No. 62/632,217, filed on Feb. 19, 2018.

(51) Int. Cl.
| | |
|---|---|
| *B62B 1/26* | (2006.01) |
| *B62B 1/18* | (2006.01) |
| *B62B 1/22* | (2006.01) |

(52) U.S. Cl.
CPC ............. *B62B 1/264* (2013.01); *B62B 1/186* (2013.01); *B62B 1/22* (2013.01)

(58) Field of Classification Search
CPC ............ B62B 1/264; B62B 1/186; B62B 1/22
See application file for complete search history.

(56) References Cited

U.S. PATENT DOCUMENTS

| | | | | |
|---|---|---|---|---|
| 638,215 | A * | 12/1899 | Condon | B62B 1/264 280/47.23 |
| 665,583 | A * | 1/1901 | Schnellbacher | B62B 1/264 414/456 |
| 2,745,675 | A * | 5/1956 | Haynes | B62B 1/18 280/47.24 |
| 3,092,418 | A * | 6/1963 | Themascus | B62B 1/24 298/3 |
| 5,433,463 | A | 7/1995 | Finley | |

(Continued)

FOREIGN PATENT DOCUMENTS

| | | |
|---|---|---|
| CH | 136795 A | 11/1929 |
| CN | 203228801 U | 10/2013 |

(Continued)

OTHER PUBLICATIONS

International Search Report and Written Opinion dated May 2, 2019.

*Primary Examiner* — Bryan A Evans
(74) *Attorney, Agent, or Firm* — Norton Rose Fulbright Canada LLP

(57) ABSTRACT

A dolly includes a frame having an axle extending between dolly wheels and defining a pivot axis. The frame has a support member with a ground-engaging element spaced apart from the dolly wheels. A lever arm is mounted to the frame and extends to a handle. The lever arm is positioned on a first side of the axle. A container support is mounted to the frame on the first side of the axle. The handle is manipulable to pivot the support member, the lever arm, and the container support about the pivot axis between at least a storage position and a discharge position. In the storage position, the container axis has an upright orientation and the ground-engaging element is spaced from the ground surface. In the discharge position, the container axis has an orientation being substantially parallel to the ground surface, and the ground-engaging element abuts against the ground surface.

20 Claims, 5 Drawing Sheets

(56) References Cited

U.S. PATENT DOCUMENTS 8,276,923 B2  10/2012  Plesh
8,534,681 B2   9/2013  Tomsha

FOREIGN PATENT DOCUMENTS

| CN | 104691594 A  | 6/2015  |
|----|--------------|---------|
| CN | 205034141 U  | 2/2016  |
| CN | 205819235 U  | 12/2016 |
| GB | 2282098 A    | 3/1995  |
| KR | 101813686 B1 | 12/2017 |

\* cited by examiner

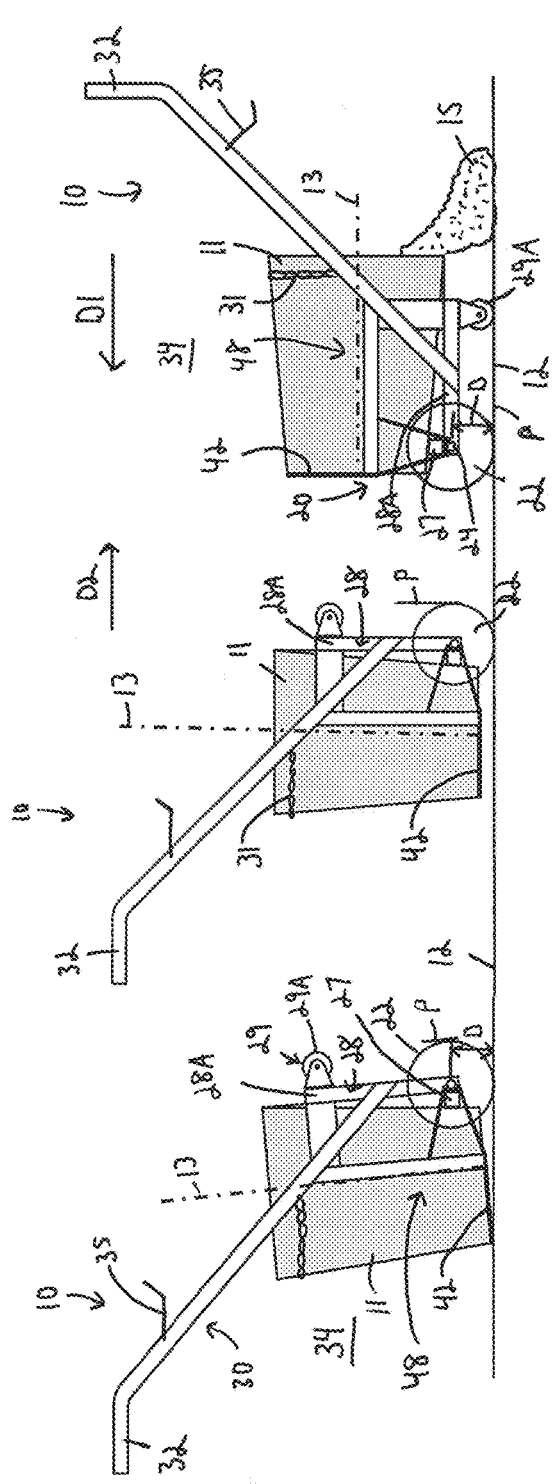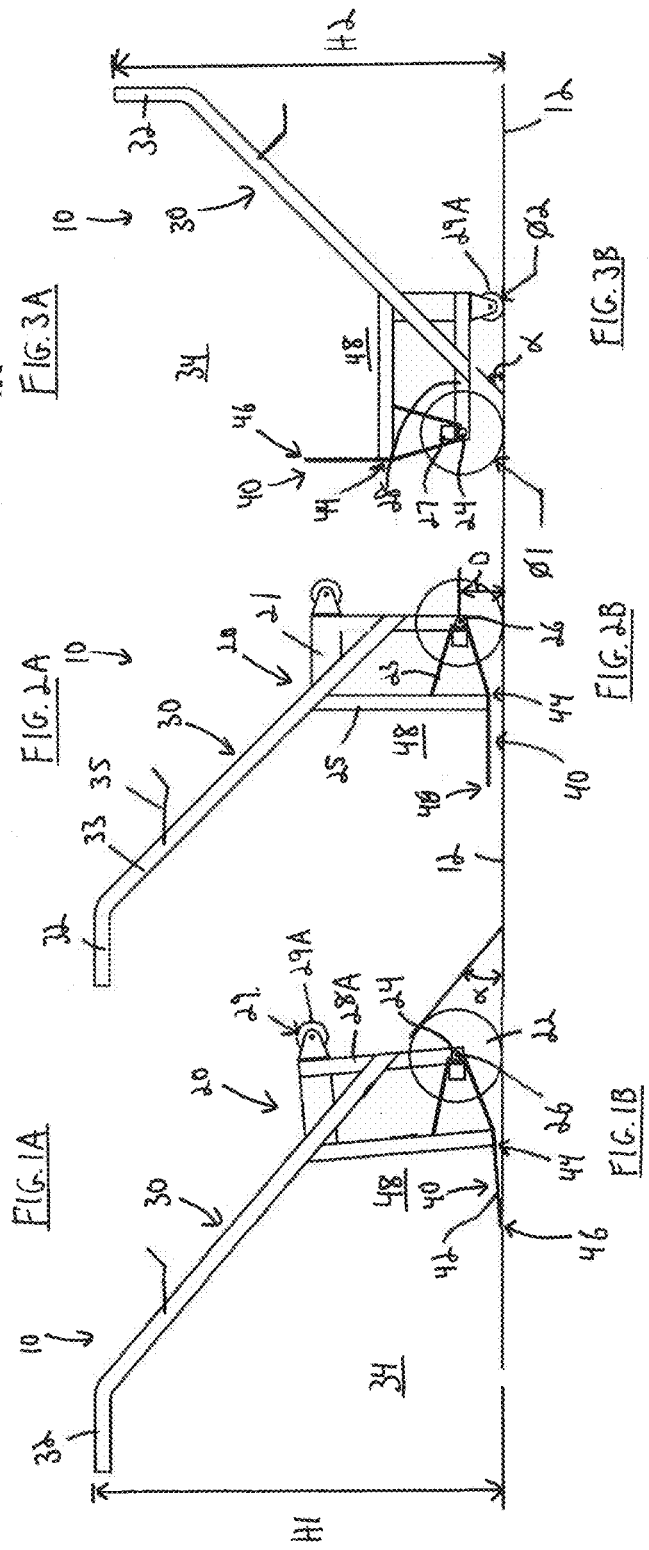

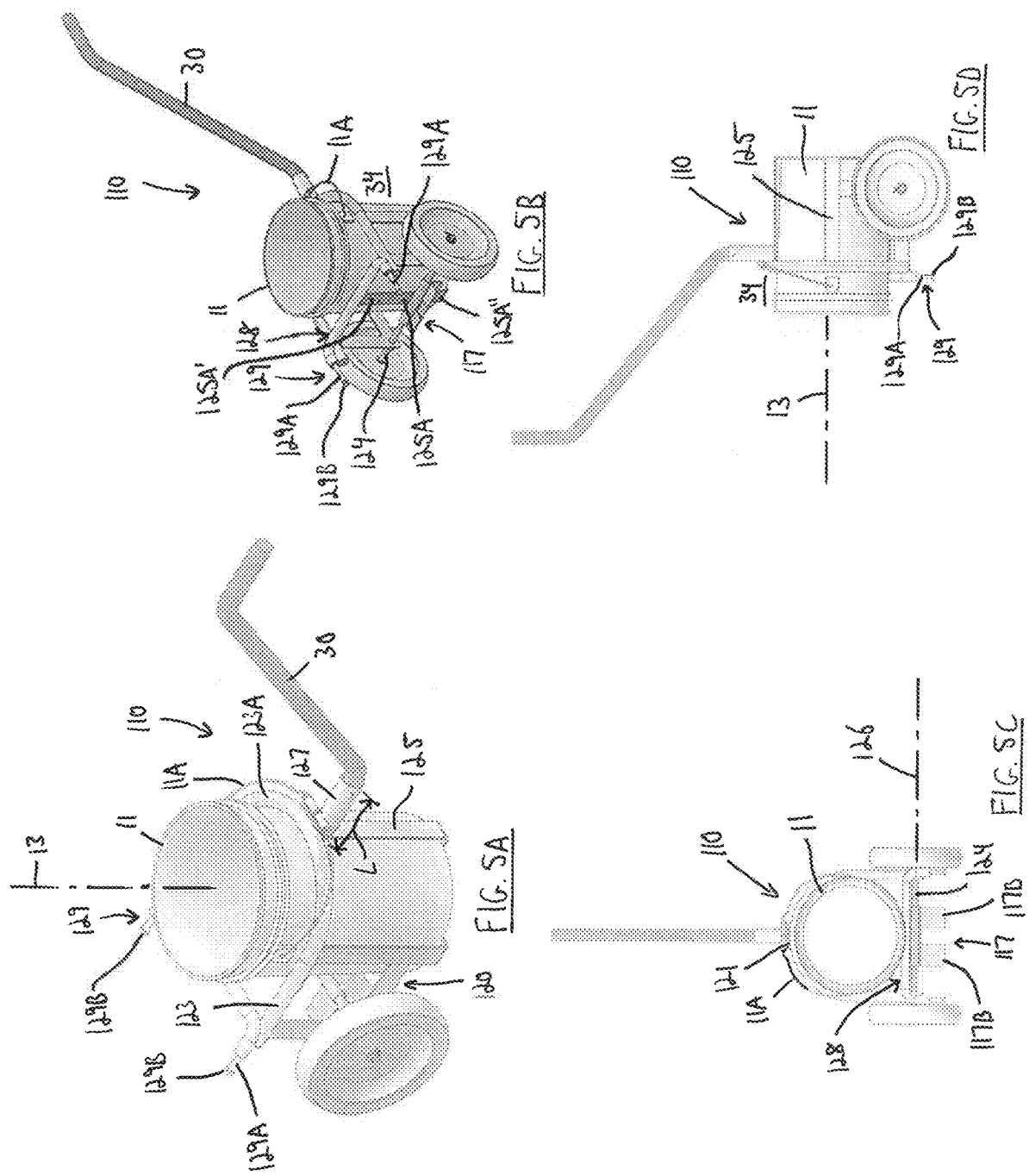

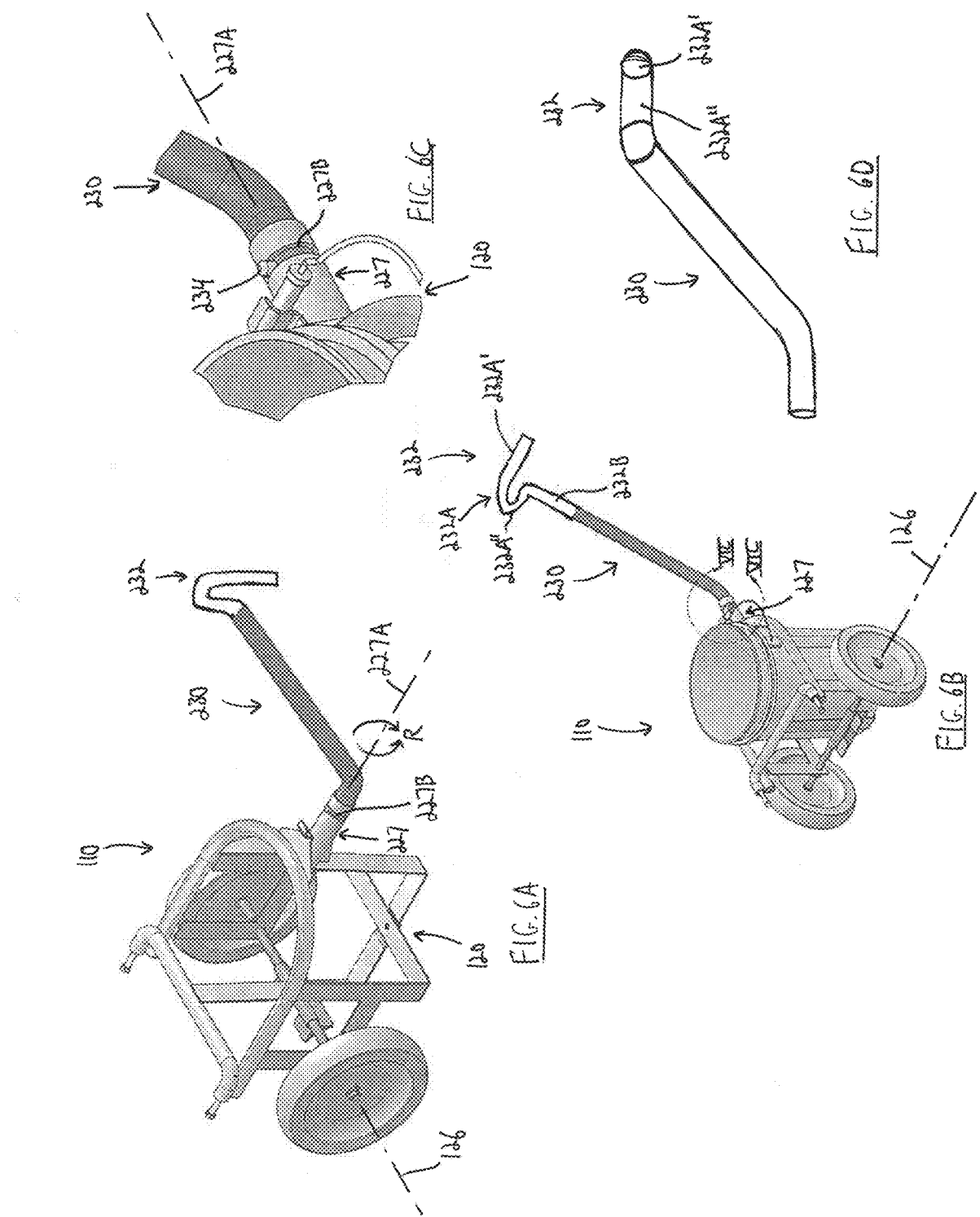

DOLLY AND METHOD OF MANIPULATING SAME

CROSS-REFERENCE TO RELATED APPLICATIONS

This application claims priority to US provisional patent application having application No. 62/632,217 and filed on Feb. 19, 2018, the entire contents of which are incorporated by reference herein.

TECHNICAL FIELD

The application relates generally to devices used to move loads and, more particularly, to a dolly.

BACKGROUND

On construction sites, it is often necessary to move a container from one location to another. Some conventional dollies used for this purpose require that the container be unloaded from the dolly before its contents can be emptied. Some conventional dollies do not permit the contents of the container to be manipulated while the container is loaded on the dolly. Some conventional dollies do not allow for the contents of the container to be emptied while the dolly is being displaced. These limitations of some conventional dollies increase the manual labour required by the user of the dolly, and the time required to prepare the contents of the container.

SUMMARY

In one aspect, there is provided a dolly for transporting a container having a container axis along a ground surface, the dolly comprising: a frame having an axle extending between two dolly wheels being displaceable along the ground surface, the axle defining a pivot axis for the dolly, the frame having a support member with a ground-engaging element spaced apart from the dolly wheels, the support member being pivotable about the pivot axis; a lever arm mounted to the frame and extending away therefrom to a handle, the lever arm being positioned on a first side of the axle, the lever arm being pivotable about the pivot axis; and a container support mounted to the frame on the first side of the axle, the container support being spaced from the handle of the lever arm to define a space to receive the container on the first side of the axle, the container support being pivotable about the pivot axis; the handle being manipulable by a user of the dolly to pivot the support member, the lever arm, and the container support about the pivot axis between at least a storage position and a discharge position, wherein: in the storage position, the container axis has an upright orientation and the ground-engaging element is spaced from the ground surface; and in the discharge position, the container axis has an orientation being substantially parallel to the ground surface, and the ground-engaging element abuts against the ground surface.

In another aspect, there is provided a method for manipulating a container with a dolly, the method comprising: placing the container on a container support of the dolly disposed between a handle of the dolly and an axle of wheels of the dolly, an axis of the container having an upright orientation; and pivoting the dolly about a pivot axis defined by the axle of the wheels to discharge contents of the container onto a ground surface, the container remaining disposed between the handle and the axle, and the axis of the container having an orientation being substantially parallel to the ground surface.

DESCRIPTION OF THE DRAWINGS

Reference is now made to the accompanying figures in which:

FIG. 1A is a schematic side elevational view of a dolly for transporting a container, the dolly being shown in a storage position;

FIG. 1B is a schematic side elevational view of the dolly of FIG. 1A in the storage position, shown without the container;

FIG. 2A is a schematic side elevational view of the dolly and the container of FIG. 1A, the dolly being shown in an upright displacement position;

FIG. 2B is a schematic side elevational view of the dolly of FIG. 1A without the container, the dolly being shown in the upright displacement position of FIG. 2A;

FIG. 3A is a schematic side elevational view of the dolly and the container of FIG. 1A, the dolly being shown in a discharge position;

FIG. 3B is a schematic side elevational view of the dolly of FIG. 1A without the container, the dolly being shown in the discharge position of FIG. 3A;

FIG. 5A is another perspective view of a dolly and the container, the dolly being shown in a storage position;

FIG. 5B is another perspective view of the dolly and the container of FIG. 5A in the storage position;

FIG. 5C is a top view of the dolly and the container of FIG. 5A in the storage position, or an end view of the dolly and the container in the discharge position;

FIG. 5D is a side elevational view of the dolly and the container of FIG. 5A in a discharge position;

FIG. 6A is another perspective view of the dolly of FIG. 5A, showing a pivotable lever arm;

FIG. 6B is another perspective view of the dolly and pivotable lever arm shown in FIG. 6A;

FIG. 6C is an enlarged view of portion VIC-VIC of FIG. 6B; and

FIG. 6D is a side elevated view of the lever arm of the dolly of FIG. 5A.

DETAILED DESCRIPTION

Figure 4A:
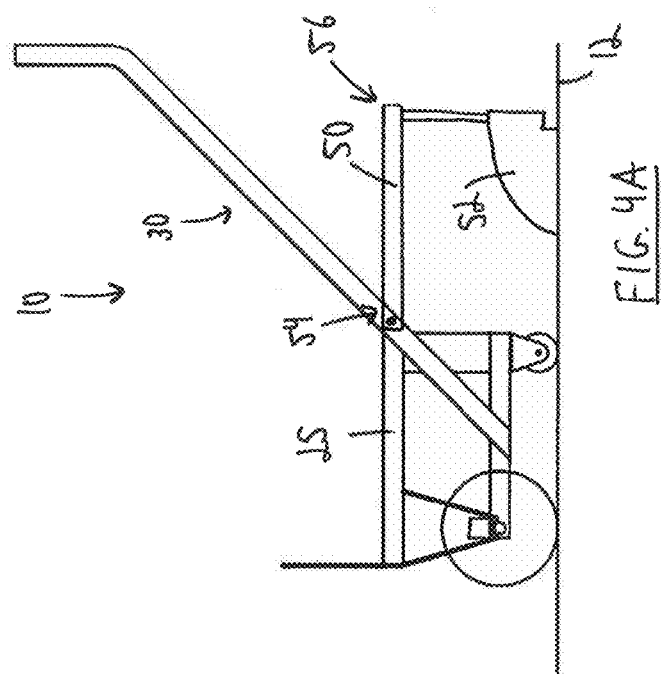
FIG. 4A is a schematic side elevational view of the dolly of FIG. 1A with an optional trowel support arm and a trowel, the dolly being shown in a discharge position.

FIGS. 1A and 1B illustrate a dolly 10 for transporting a container 11 along a ground surface 12. The dolly 10 is operated manually by a user, who physically manipulates the dolly 10 to displace it and the container 11 along the ground surface 12. As will be described in greater detail below, the dolly 10 is also manipulated by the user to empty the contents of the container 11 onto the ground surface 12. The container 11 in the depicted embodiment is a cylindrical bucket with a diameter that tapers from the top of the bucket to the bottom. The container 11 can be other types of objects capable of holding a load, such as a barrel, bin, box, cauldron, etc. The container 11 may also be a load itself, rather than an object for holding the load. Irrespective of its form, the container 11 has a container axis 13. The container axis 13 defines the orientation of the container 11. In the depicted embodiment where the container 11 is a bucket, the container axis 13 is a center axis. In FIG. 1A, the container axis 13 is upright because the container 11 is upright. The term "upright" as used herein refers to a vertical orientation and minor deviations therefrom.

The dolly 10 has a frame 20 which supports the container 11 when the dolly 10 is stationary, moving, and tipped over. The frame 20 allows the dolly 10 to be displaced. The frame 20 has two dolly wheels 22 which are connected to each other by an axle 24, and which engage the ground surface 12 for displacement therealong. The axle 24 defines a pivot axis 26. The pivot axis 26 is the line about which the frame 20, and thus the dolly 10, pivots in order to displace the dolly 10 and to empty the contents of the container 11, as described in greater detail below. The axle 24 defines a width of the frame 20. The axle 24 extends in a direction being transverse to a direction of displacement of the dolly 10.

The frame 20 also has one or more support members 28. The support member 28 is any suitable structural component used to help support the container 11 when it is pivoted with the dolly 20 in order to empty the contents from the container 11. The support member 28 thus helps to support the container 11 when it has an orientation where the container axis 13 is substantially parallel to the ground surface 12. In FIGS. 1A and 1B, the support member 28 includes a support arm 28A. The support arm 28A helps to support the container 11 when it is lying on its side so that its contents can be emptied, as will be described in greater detail below. The support arm 28A is any suitable beam, bar, shaft, joist, or combination or framework of these components which has a length and extends between two ends. One end of the support arm 28A is mounted to the frame 20. In the depicted embodiment, one end of the support arm 28A is mounted to the axle 24. The support arm 28A is therefore pivotable about the pivot axis 26. The support arm 28A extends from its attachment to the axle 24 to another free end.

The support member 28 has one or more ground-engaging elements 29. The ground-engaging elements 29 abut against the ground surface 12 when the container 11 when it is lying on its side so that its contents can be emptied. The ground-engaging elements 29 are spaced apart from the dolly wheels 22 so as to help support the container 11 when it is lying on its side. In the depicted embodiment, the ground-engaging elements 29 are spaced apart from the dolly wheels 22 along a radial line from the pivot axis 26. As explained in greater detail below, the ground-engaging elements 29 may be adjustable in length so as to adjust the inclination of the container 11 relative to the ground surface 12, i.e. to adjust the angle formed between the container axis 13 and the ground surface 12.

In FIGS. 1A and 1B, the ground-engaging elements 29 include one or more caster or caster wheels 29A mounted to the support arm 28A. In the depicted embodiment, the caster wheel 29A is mounted to the distal, free end of the support arm 28A, but the caster wheel 29A may be mounted elsewhere to the support arm 28A. The caster wheel 29A facilitates the displacement of the dolly 10 when the container 11 is on its side and its contents are being emptied. The caster wheel 29A in the depicted embodiment is a swivel wheel to allow the dolly 10 to more easily turn. The caster wheel 29A therefore rotates about a caster wheel axis, and also swivels about a separate swivel axis. In an alternate embodiment, the caster wheel 29A is locked in only one degree of freedom (i.e. no swivel functionality), and thus only rotates about its caster wheel axis. The caster wheel 29A is mounted to the support arm 28A with a suitable bracket. In an embodiment, the support arm 28A includes a telescopic member to allow a length of the support arm 28A to be adjusted. This allows the distance of the caster wheel 29A from the axle 24 to be adjusted, to better accommodate containers 11 of different heights.

Still referring to FIGS. 1A and 1B, the dolly 10 also has a lever arm 30. The lever arm 30 is a stiff member which is manipulated by the user of the dolly 10 to both displace the dolly 10 and to pivot it about the pivot axis 26. The lever arm 30 may therefore be any suitable beam, bar, shaft, joist, framework, or member which has a length and extends between two ends. One end of the lever arm 30 is mounted to the axle 24, and the other end of the lever arm 30 has a handle 32. The lever arm 30 is therefore pivotable about the pivot axis 26. In the depicted embodiment, the lever arm 30 is mounted indirectly to the axle 24. One of the ends of the lever arm 30 is mounted to the support arm 28A, which is itself mounted to the axle 24. The lever arm 30 is inclined relative to the support arm 28A to form a non-zero angle with respect thereto. In an alternate embodiment, the lever arm 30 is mounted to another component of the frame 20. In yet another embodiment, the lever arm 30 is mounted directly to the axle 24. In an embodiment, the lever arm 30 includes a telescopic member to allow a length of the lever arm 30 to be adjusted. This allows the lever arm 30 to better accommodate users of different heights. The lever arm 30 and the handle 32 are positioned on a first side 34 of the axle 24. The first side 34 of the axle 24 is the side of the dolly 10 where the container 11 is located. In FIGS. 1A and 1B, the first side 34 is left of the axle 24.

The dolly 10 also has a container support 40. The container support 40 supports the weight of the container 11 when the container 11 has an upright orientation. The container support 40 support may therefore take any suitable configuration to achieve such functionality. In the depicted embodiment, the container support 40 includes a support plate 42 on which the container 11 rests. The support plate 42 defines a planar surface for supporting the container 11. One possible alternate embodiment of the container support 40 are described below.

A first end 44 of the container support 40 is mounted to the axle 24. The container support 40 is therefore pivotable about the pivot axis 26. In FIGS. 1A and 1B, the first end 44 of the container support 40 is mounted indirectly to the axle 24. The first end 44 of the container support 40 is mounted to a component of the frame 20, as described in greater detail below, which is itself mounted to the axle 24. In an alternate embodiment, the container support 40 is mounted to another component of the frame 20. In yet another embodiment, the container support 40 is mounted directly to the axle 24. The container support 40 extends from the first end 44 to a second end 46 of the container support 40.

The container support 40 is also located on the first side 34 of the axle 24. The first and second ends 44,46 of the container support 40 are positioned on the first side 34 of the axle 24. It will therefore be appreciated that the lever arm 30 extends from the axle 24 in the same direction that the container support 40 extends from the axle 24. The container support 40 is spaced apart from the handle 32 of the lever arm 30 such that an opening or space 48 is defined between the lever arm 30 and the container support 40. The container 11 is positioned in the space 48 on the first side 34 of the axle 24. In the embodiment of FIGS. 1A and 1B, the handle 32 and lever arm 30 are above the container support 40. The opening or space 48 underneath the handle 32 and above the container support 40 provides sufficient space for the user of the dolly 10 to load the container 11 onto the container support 40 on the first side 34 of the axle 24. The space 48 allows the user to access the container 11 from the side and from above, such that the user is able to handle or manipulate the contents of the container 11 while it is loaded on the dolly 10. For example, the user can access the container 11 from above because of the space 48 to mix the contents of the container 11, add more material to the contents of the container 11, and to clean the interior of the container 11.

The operation of the dolly 10 is now described in greater detail. The user controls the dolly 10 by seizing the handle 32 to displace and pivot the dolly 10. The handle 32 is manipulable by the user to pivot the support arm 28A, the lever arm 30, the container support 40, and other components of the dolly 10 about the pivot axis 26 between multiple positions. These positions include, but are not limited to, a storage position, as shown in FIGS. 1A and 1B, and a discharge position, as shown in FIGS. 3A and 3B. The storage and discharge positions are only two possible positions for the dolly 10, as will be apparent from the description of other positions of the dolly 10 provided below. In every position assumed by the dolly 10, the dolly wheels 22 engage the ground surface 12.

FIGS. 1A and 1B show the dolly 10 in the storage position. In this position, the container axis 13 and the support arm 28A have an upright orientation. The container 11 is therefore substantially upright and substantially perpendicular to the ground surface 12. In this upright position, the contents of the container 11 are unlikely to escape the container 11. In the storage position, the ground-engaging elements 29, e.g. the caster wheel 29A, is vertically spaced from the ground surface 12.

In the storage position, the second end 46 of the container support 40 abuts against the ground surface 12 and the first end 44 of the container support 40 is vertically spaced from the ground surface 12. A portion of the container support 40 away from the axle 24 therefore touches the ground surface 12, and the remainder of the container support 40 extends toward the axle 24 and is spaced above the ground surface 12. The support plate 42 is therefore inclined at a non-zero angle with respect to the ground surface 12. Part of the weight of the dolly 10 is therefore supported by the second end 46 of the container support 40, such that the dolly 10 "leans" on the second end 46 of the container support 40 when it is stationary in the storage position.

FIGS. 3A and 3B show the dolly 10 in the discharge position. In the discharge positon, the container 11 is lying on its side so that its contents 15 can be discharged, or emptied, onto the ground surface 12. The container axis 13 and the support arm 28A have an orientation that is substantially parallel to the ground surface 12. The ground-engaging elements 29, e.g. the caster wheel 29A, abuts against and rests against the ground surface 12 and is displaceable therealong. The caster wheel 29A, and thus the support arm 28A, help the frame 20 to support the weight of the container 11. In the discharge position, the first side 34 is above the axle 24, and the handle 32 is spaced apart from the container support 40 in the direction of the caster wheel 29A. Both the first and second ends 44,46 of the container support 40 are vertically spaced from the ground surface 12 and thus provide no impediment to displacement of the dolly 10.

The dolly 10 is displaceable along the ground surface 12 with the dolly wheels 22 and with the caster wheel 29A when in the discharge position, and the dolly 10 is thus in another position referred to herein as the discharge displacement position. In the discharge displacement position, the user may move the container 11 while it has a substantially horizontal orientation on the dolly 10. The user can push the dolly 10 by using the handles 32 in at least a direction D1. In a typical use of the dolly 10, the direction D1 is opposite to the direction in which the contents 15 of the container 11 are emptied from the container 11. Moving the dolly 10 in direction D1 allows the user to empty the container 11 of its contents 15 onto the ground surface 12 while moving the dolly 10 away from the emptied contents 15, so as to form a line or column of emptied contents 15 on the ground surface 12. The space 48 in the discharge position is high enough to allow for full access to the container 11 by the user to empty it and to clean it.

Another position of the dolly 10 is shown in FIGS. 2A and 2B. The dolly 10 is in the upright displacement position. This position allows for the container 11 to be displaced in an upright orientation with the dolly 10. In the upright displacement position, the container axis 13 and the support arm 28A have an upright orientation, and both the first and second ends 44,46 of the container support 40 are vertically spaced from the ground surface 12, similarly to the storage position. The dolly 10 is therefore displaceable along the ground surface 12 with the dolly wheels 22. Typically, the user will push the dolly 10 via the handle 32 in the direction D2. The direction D2 is opposite to the push direction D1 described above. It will be appreciated that the user can also displace the dolly 10 in direction D1 when it is in the upright displacement position by pulling on the handle 32.

The user positions the dolly 10 in the upright displacement position from the storage position by seizing the handle 32 to pivot the lever arm 30 about the pivot axis 26. This in turn raises the second end 44 of the container support 40 from the ground surface 12, such that the user can therefore push or pull on the handle 32 to displace the dolly 10. The support plate 42 of the container support 40, which in the depicted embodiment, is inclined relative to the ground surface 12 in the storage position, has a portion which assumes a substantially horizontal or level orientation in the upright displacement position. The relatively small angle of inclination of the support plate 42 relative to the ground surface 12 when in the storage position translates into a substantially zero-angle inclination of portions of the support plate 42 relative to the ground surface 12 when the dolly 10 is pivoted into the upright displacement position. The container 11, resting on the substantially horizontal and level portions of the support plate 42 in the upright displacement position, therefore also remains substantially level such that it can transported with minimal risk that its contents will escape. The container axis 13 in FIGS. 2A and 2B is substantially vertical. Raising the second end 44 of the container support 40 from the ground surface 12 in the upright displacement position also provides spacing underneath the container support 40 to avoid obstacles on the ground surface 12 when the dolly 10 is displaced therealong.

To position the dolly 10 in the discharge position from either the storage position or the upright displacement position, the user need only pivot the handle 32 about the pivot axis 26 until the caster wheel 29A abuts against the ground surface 12. To position the dolly 10 in the storage or upright displacement positions from the discharge position, the user need only pivot the handle 32 about the pivot axis 26 until the container 11 is substantially upright, such that the second end 44 of the container support 40 is spaced from the ground surface (i.e. in the upright displacement position), or abutting against the ground surface 12 (i.e. in the storage position).

Referring to FIGS. 1A to 1B, and 3A to 3B, additional characteristics of the dolly 10 in both the storage and discharge positions are now described in greater detail.

A first height H1 of the handle 32 is defined between the ground surface 12 and the handle 32 in the storage position (see FIG. 1B). A second height H2 of the handle 32 is defined between the ground surface 12 and the handle 32 in the discharge position (see FIG. 3B). The first and second heights H1,H2 of the handle 32 are substantially equal. In the depicted embodiment where the ground surface 12 is smooth, the first and second heights H1,H2 would be equal in value within an acceptable range of tolerances. It will therefore be appreciated that the space 48 defined between the handle 32 and the container support 40 has substantially the same size in both the storage and discharge positions, thus providing for equal access for loading the container 11 and mixing its contents 15, and for emptying the container 11 and cleaning it of its contents 15. A non-limiting example of the first height H1 is 29.3 in, and a non-limiting example of the second height H2 is 29.6 in.

To help achieve substantially equal first and second heights H1,H2, the lever arm 30 forms an angle α with respect to the ground surface 12 in both the storage and discharge positions. The angle α in the depicted embodiment is about 45°. In the depicted embodiment, the angle α is the same in both the storage and discharge positions. When the angle α is about 45°, the first and second heights H1,H2 are substantially equal and so is the size of the space 48. In an alternate embodiment, the angle α is less than or equal to 45°. For example, in an embodiment, the angle α is about 30° in the storage position and about 60° in the discharge position. Varying the angle α allows the size of the space 48 to be adjusted in both the storage and discharge positions depending on the contents 15 of the container 11, amongst other factors.

The handle 32 has a substantially horizontal orientation in the storage position (see FIGS. 1A and 1B). The handle 32 has an upright orientation in the discharge position (see FIGS. 3A and 3B). The orientation of the handle 32 is thus ergonomically suited for each position. When the user is pivoting the dolly 10 in the storage position, or pushing the dolly 10 in the upright displacement position, the handle 32 is oriented substantially horizontally which may help the user to partially support the weight of the dolly 10 and the container 11. Similarly, the task of emptying the container 11 in the discharge position is facilitated by the upright orientation of the handle 32, which allows the user to better seize the dolly 10 and immobilize it with one hand while the other hand empties the container 11.

Still referring to FIGS. 1A to 1B, and 3A to 3B, the frame 20 includes a spacer block 27 mounted to the support arm 28A adjacent to the axle 24 on the first side 34 of the axle 24. The spacer block 27 spaces one end of the container 11 away from the support arm 28A. In the depicted embodiment, the spacer block 27 spaces the tapered lower end of the container 11 away from the support arm 28A. This facilitates emptying the container 11 of its contents 15 when it is in the discharge position. Referring to FIG. 3A, the spacer block 27 spaces or "lifts" the lower end of the container 11 to further orient the container axis 13 toward the ground surface 12, thereby facilitating the emptying of the container 11 by gravity. This may be helpful where the dolly 10 is positioned on an upwardly inclined surface when in the discharge position.

The dolly wheels 22 have a diameter ø1 that is greater than a diameter ø2 of the caster wheel 29A (see FIG. 3B). This further helps ensure that the container 11 and the container axis 13 are further inclined toward the ground surface 12 when in the discharge position. The diameter ø1 of the dolly wheels 22 may be selected to influence the stability of the dolly 10. The diameter ø1 determines the distance of the axle 24, and thus of the pivot axis 26, from the ground surface 12. This distance may be varied to vary the ease by which the user pivots the lever arm 30 about the pivot axis 26. For example, increasing the diameter ø1 also decreases the difficulty of pivoting the lever arm 30 about the pivot axis 26, while decreasing the diameter ø1 increases the difficulty of pivoting the lever arm 30 about the pivot axis 26 and thus contributes to the stability of the dolly 10. Some non-limiting examples of the diameter ø1 for the dolly wheels 22 are 10 in. and 6 in.

Referring to FIGS. 1A to 3B, a distance D of the axle 24 from the ground surface 12 remains constant in the storage, storage displacement, and discharge positions. The bottom surface of the dolly wheels 22 and the bottom surface of caster wheel 29A lie in the same plane P in the storage, storage displacement, and discharge positions, which is parallel to the support arm 28A.

Additional components of the dolly 10 are described with reference to FIG. 2B. The frame 20 includes two side support members 25 which are spaced apart from another along a width of the frame 20 defined by the axle 24. The second end 44 of the container support 40 is mounted to the side support members 25. The side support members 25 are joined to the axle 24 with an axle bracket 23 at one of their ends, and are joined to the support arm 28A with a container support arm 21. The side support members 25 and the container support arm 21 help to restrain movement of the container 11 when it is in the discharge position. The container support arm 21 is curved to follow the curved outer surface of the container 11. An attachment member 31 is removably attachable to the lever arm 30 and wrappable about the container 11 to secure the container 11 in the space 48 between the lever arm 30 and the container support 40 (see FIG. 2A). The attachment member 31 is a chain in the depicted embodiment, but a strap, belt, or other component may also be used to secure the container 11 in place particularly when tipped over in the discharge position.

In the depicted embodiment, the caster wheel 29A and the support arm 28A are centered along the width of the frame 20. In an alternate embodiment, two support arms 28 are provided on opposite sides of the axle 24, and a swivel caster wheel 29A is mounted to each support arm 28A. By positioning the caster wheels 29A outside of the area where the contents 15 of the container 11 are emptied, it may be possible to displace the container 11 in both directions D1,D2 without dirtying the caster wheels 29A when the container 11 is in the discharge position.

The lever arm 30 in an embodiment has two lever arm members 33 each spaced apart from one another along a width of the frame 20. The lever arm members 33 delimit the outer width of the space 48 between the lever arm 30 and the container support 40, and allow the user to insert the container 11 into the space 48. In an alternate embodiment, the lever arm 30 has only one lever arm member 33. A mixer support 35 is mounted to the lever arm 30 to support a mechanical mixer on the dolly 10.

Figure 4B:
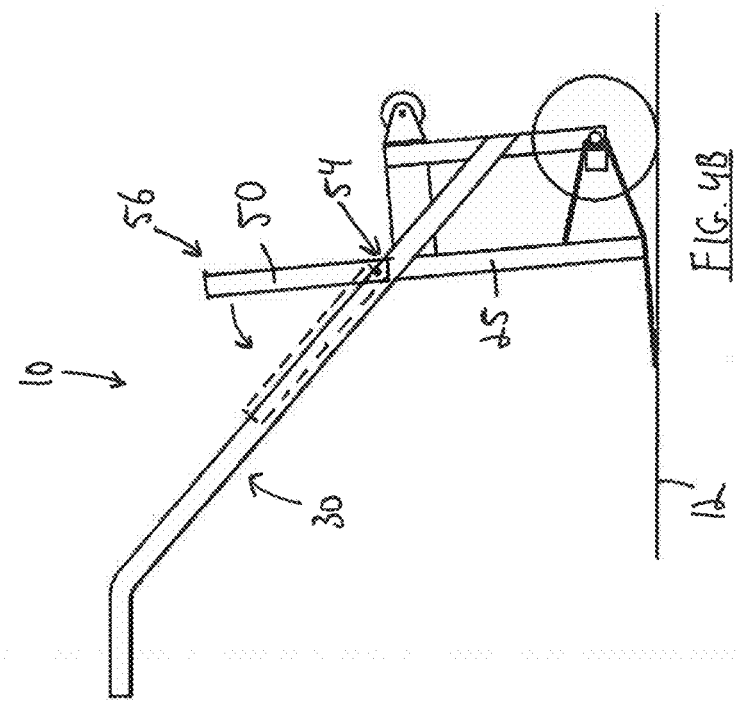
FIG. 4B is a schematic side elevational view of the dolly of FIG. 1A with the optional trowel support arm of FIG. 4A, the dolly being shown in the storage position.

Referring to FIGS. 4A and 4B, the dolly 10 has a trowel support arm 50 and a trowel 52. In an embodiment where the contents 15 of the container 11 are flowable materials, the trowel 52 helps to spread and smooth the contents 15 against the floor surface 12. The trowel support arm 50 has a first end 54 mounted to the lever arm 30 and extends from the first end 54 to a second end 56 away from the frame 20. The trowel 52 is mountable to the second end 56. The first end 54 may also be mounted to one of the side support members 25. In the discharge position, as shown in FIG. 4A, the trowel support arm 50 has an orientation being substantially parallel to the ground surface 12. The trowel support arm 50 has an upright orientation in the storage position, as shown in FIG. 4B. The trowel support arm 50 may be pivotably mounted to the lever arm 30 such that, when the trowel 52 is not in use in the storage position, the trowel support arm 50 may be pivoted to be aligned with the lever arm 30.

Figure 5E:
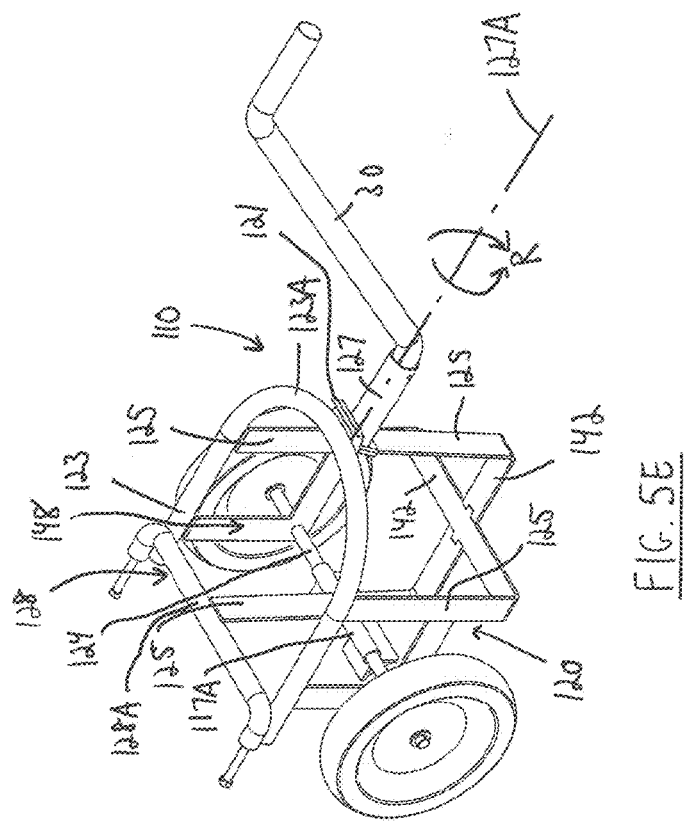
FIG. 5E is a perspective view of the dolly of FIG. 5A in the storage position, shown without the container.

Another embodiment of the dolly 110 is shown in FIGS. 5A to 5F. The frame 120 includes side support members 125 which are spaced apart from another along a width of the frame 120 defined by the axle 124. An upper frame member 123 is mounted to all of the side support members 125 and includes a curved portion 123A. The side support member 125 and the upper frame member 123 collectively delimit and define the volume or space 148 for receiving the container 11. A lever socket 127 is mounted to the frame 120 and extends outwardly therefrom on the first side 34 of the axle 124. The lever socket 127 is a hollow body that is used to removably receive therein one end of the lever arm 30, so as to removably attach the lever arm 30 to the frame 120. When the lever arm 30 is removed from the lever socket 127, the lever socket 127 has a length L that is sufficiently long enough to allow the user to grip the lever socket 127 and to use it to manipulate and displace the dolly 110. Referring to FIG. 5E, the lever socket 127 is a hollow cylindrical body and defines a lever socket axis 127A. In FIG. 5E, the lever arm 30 is rotatably mounted to the lever socket 127. The lever arm 30 is rotatable about the lever socket axis 127A in a rotation direction R (e.g. clockwise and counter clockwise) such that the orientation of the lever arm 30 and its handle 32 may be changed as desired. The lever arm 30 may be rotated about the lever socket axis 127A and then locked in a new rotated position.

The frame 120 in the depicted embodiment has a handle attachment 121 mounted to a rear of the frame 120. The handle attachment 121 is mounted to the curved portion 123A of the upper frame member 123 on the first side 34 of the axle 124. The handle attachment 123 is configured to receive therein a handle 11A of the container 11 (see FIGS. 5A to 5D). The handle 11A is removably received in the handle attachment 123. The engagement of the handle 11A with the handle attachment 123 may take any suitable form to achieve this functionality, such as press fit, male/female, button, etc. Mounting the handle 11 to the handle attachment 123 may help secure the container 11 in position, particularly when the container axis 13 is upright and the dolly 110 is being displaced.

The dolly 110 has a container support 117 that is rotatably mounted about the axle 124 between the dolly wheels 122. The container support 117 has a cylindrical housing 117A with suitable internal bearings to mount the housing 117A about the outer surface of the axle 124 and allow relative rotational movement between the housing 117A and the axle 124. Flaps 117B of the container support 117 extend radially outwardly from the housing 117A. The flaps 117B and the housing 117A are rotatable about the pivot axis 126 and toward the space 148 to provide a support surface on which part of the container 11 may rest. When the flaps 117B are rotated inwardly into the space 148, they help to support the weight of the container 11 positioned in the space 148 defined by the frame 120, which may be suitable for containers 11 that have shorter heights.

Referring to FIGS. 5A to 5D, the ground-engaging element 129 includes one or more adjustable arms 129A whose length may be varied. In the depicted embodiment, the two arms 129A are spaced apart from one another along a width of the dolly 110. In the depicted embodiment, the arms 129A are mounted to the support member 128. The linearly-adjustable arms 129A are displaceable relative to the support member 128, so that the free ends 129B of the arms 129A extend toward and away from the support member 128. In an embodiment, a wheel, such as the caster wheel 29A described above, is mounted to the ends 129B of the arms 129A. Adjusting the length of the arms 129A allows the inclination of the container 11 relative to the ground surface 12 to be adjusted. This also allows adjusting the angle formed between the container axis 13 and the ground surface 12 when the container 11 is in the discharge position. A wheel mounted to the support member 128 may also be adjustable relative to the support member 128.

Figure 5F:
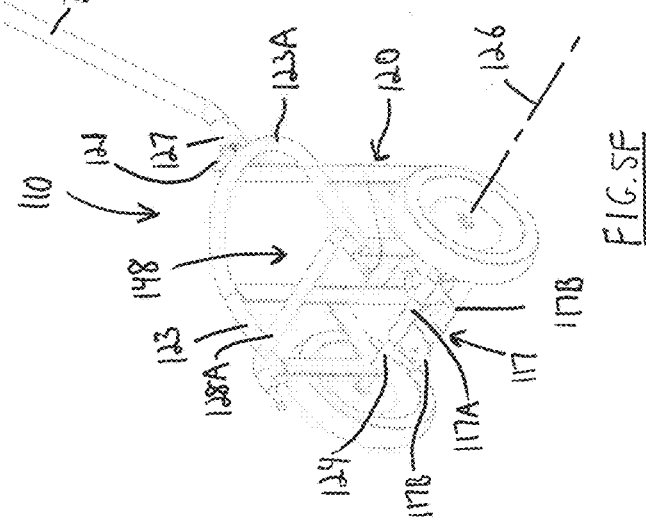
FIG. 5F is another perspective view of the dolly of FIG. 5A in the storage position, shown without the container.

Referring to FIGS. 5E and 5F, the container support 140 includes horizontal base members 142. The base members 142 are connected together, and to some of the side support members 125, to define a base surface on which the container 11 rests when in the storage position. When the base members 142 are spaced from the ground surface 12 and parallel therewith, they define a height from the ground surface 12 that is different from the distance D of the axle 124 from the ground surface 12. In an embodiment, the height of the base members 142 from the ground surface 12 is less than the distance D of the axle 124 from the ground surface 12. When the dolly 110 is in the storage position, a portion of the base members 142 abuts against the ground surface 2, such that the container axis 13 is inclined relative to ground surface 12. Part of the weight of the dolly 110 is therefore supported by the abutted portions of the base members 142, such that the dolly 110 "leans" on the abutted portions when it is stationary in the storage position. The support member 128 includes a support arm 128A having an orientation parallel to the axle 124. The support arm 128A extends between and is mounted opposed ends of the upper frame member 123.

Referring to FIG. 5B, a first side support member 125A is attached to the support arm 128A and to the axle 124. The axle 124 divides the first side support member 125A into a first segment 125A' on one side of the axle 124, and a second segment 125A" on the other side of the axle 124. The length of the first and second segments 125A'125A" is unequal. The length of the first segment 125A' is greater than the length of the second segment 125A". When the container 11 is on its side in the discharge position, its contents 15 will migrate from the bottom of the container 11 to be emptied out of the open top end of the container 11. For some contents 15 (e.g. grout or other cementitious material), this migration may occur relatively slowly, such that a significant mass of the contents 15 remains along the bottom of the container 11 when it is lying on its side. The length of the first segment 125A' being greater than the length of the second segment 125A" in the depicted embodiment may provide more stability to the dolly 110 in such situations. In an alternate embodiment, the length of the first and second segments 125A',125A" is equal.

The description above of the components, features, and functionality of the dolly 10 applies mutatis mutandis to the dolly 110 shown in FIGS. 5A to 5F. The description of components and features of the dolly 10 which are shown in FIGS. 5A to 5F but not described in relation to these figures is incorporated by reference into the description of the dolly 110. The description of the following non-limiting list of components, features, and functions attributed above to the dolly 10 is also attributed to the dolly 110 shown in FIGS. 5A to 5F: lever arm 30, operation of the dolly 10 between the storage and discharge positions, the discharge and upright displacement positions, the height of the handle 32 of the lever arm in the storage and discharge positions, the angle α formed between the lever arm 30 and the ground surface 12 in both the storage and discharge positions, the orientation of the handle 32 in the storage and discharge positions, the constant distance D of the axle 24 from the ground surface 12 between the storage and discharge positions, and the trowel support arm 50 with the trowel 52.

Referring to FIGS. 6A to 6C, another embodiment of the lever arm 230 is shown. The lever arm 230 extends between a first end having the handle 232 and a second end pivotably mounted to the cylindrical lever socket 227, the lever socket 227 defining the lever socket axis 227A about which the lever arm 230 is rotatable. Referring to FIG. 6C, the lever socket 227 has a circumferential slot 227B formed therein. The slot 227B occupies less than an entirety of the circumference of the lever socket 227. In an embodiment, the slot 227B extends around about two thirds of the circumference of the lever socket 227. The slot 227B has an axial length less than the axial length of the lever socket 227. The slot 227B is disposed closer to a distal end of the lever socket 227 than to the end of the lever socket 227 closest to the frame 120.

Still referring to FIG. 6C, a second end of the lever arm 230 has a push-pin 234. The push-pin may be resiliently depressed to insert the second end of the lever arm 230 into the lever socket 227, and the push-pin 234 expands into the slot 227B to pivotably mount the lever arm 230 to the lever socket 227. The push-pin 234 is rotatable along the slot 227B about the lever socket axis 227A, such that the extent of rotation of the lever arm 230 is defined by the push-pin 234 engaging the circumferentially-spaced boundaries of the slot 227B.

Referring to FIGS. 6B and 6D, the handle 232 includes an upper portion 232A and a lower portion 232B. The upper portion 232A includes a straight segment 232A' being transverse to an axis of the lever arm 230, and a curved segment 232A" extending from an end of the straight segment 232A'. The handle 232 thus has a substantially "U" shape. A second end of the lever arm 230 mounted to the lever socket 227 is parallel to the handle 232. Referring to FIG. 6D, the second end of the lever arm 230 and the handle 232 lie in parallel planes. As shown in FIG. 6D, the lever arm 230 forms a substantially "Z" shape.

Referring to FIGS. 6A and 6B, the lever arm 230 is rotatable about the lever socket axis 227A in the rotation direction R (e.g. clockwise and counter clockwise) such that the orientation of the lever arm 230 and its handle 232 may be changed. Using the U-shaped handle 232, it may be possible to turn the dolly 110 left and right by rotating the lever arm 230 and the handle 232 in the rotation direction R up to ±90°. Using the U-shaped handle 232, it may be possible to rotate the dolly 110 about the pivot axis 126 from the storage to discharge position (or vice versa) by rotating the lever arm 230 and the handle 232 in the rotation direction R±180°. When doing so to place the container 11 in the discharge position, the rotation of the handle 232 in the rotation direction R±180° may position the lower portion 232B of the handle 230 away from the side of the handle 230 where the operator is located.

The description above of the components, features, and functionality of the dolly 10 applies mutatis mutandis to the dolly 110 shown in FIGS. 6A to 6C. The description of components and features of the dolly 10 which are shown in FIGS. 6A to 6C but not described in relation to these figures is incorporated by reference into the description of the dolly 110. The description of the following non-limiting list of components, features, and functions attributed above to the dolly 10 is also attributed to the dolly 110 shown in FIGS. 6A to 6C: lever arm 30, operation of the dolly 10 between the storage and discharge positions, the discharge and upright displacement positions, the height of the handle 32 of the lever arm in the storage and discharge positions, the angle α formed between the lever arm 30 and the ground surface 12 in both the storage and discharge positions, the orientation of the handle 32 in the storage and discharge positions, the constant distance D of the axle 24 from the ground surface 12 between the storage and discharge positions, and the trowel support arm 50 with the trowel 52.

Referring to FIGS. 1A to 3B and 5A to 5F, there is also disclosed a method for manipulating the container 11 with the dolly 10,110. The method includes placing the container 11 on the container support 40,140, such that the container axis 13 has an upright orientation. The method includes pivoting the dolly 10,110 about the pivot axis 26,126 to discharge the contents 15 of the container 11 onto the ground surface 12. When discharging the contents 15 of the container 11, the container 11 remains disposed between the handle 32 and the axle 24,124, and the container axis 13 has an orientation being substantially parallel to the ground surface 12.

The dolly 10,110 disclosed herein helps to minimise and avoid in some instances physical/manual manipulation of the container 11 so as to allow the user to mix, transport, and empty the container 11, either totally or partially, while keeping the container 11 on the dolly 10,110. The dolly 10,110 allows the container 11 to be emptied either all at once, or along a line by displacing the container 11 in direction D1, all while keeping the container 11 on the dolly 10,110.

Although the term "dolly" is used herein, it will be appreciated that other terms used to describe pushcarts or wheeled-platforms for manually displacing loads may also be used for the dolly 10,110. Non-limiting examples of such similar terms include cart, trolley, and barrow. Some non-limiting examples of the contents 15 of the container include liquid-solid mixtures which remain permanently applied to the ground surface 12 after a drying period, such as tile cement, mortar, cementitious grout, adhesive, asphalt, terrazo, paint, and epoxy grout. The contents 15 can also be non-liquid materials, such as sand, gravel, and other solid granular materials. The ground surface 12 can be any surface forming a floor or subfloor, made of any suitable material. In some instances, the ground surface 12 can be a floor formed of tiling, such as when a user wishes to apply grout with the dolly 10,110.

Embodiments disclosed herein include:

A. A dolly for transporting a container having a container axis along a ground surface, the dolly comprising: a frame having an axle extending between two dolly wheels being displaceable along the ground surface, the axle defining a pivot axis for the dolly, the frame having a support member with a ground-engaging element spaced apart from the dolly wheels, the support member being pivotable about the pivot axis; a lever arm mounted to the frame and extending away therefrom to a handle, the lever arm being positioned on a first side of the axle, the lever arm being pivotable about the pivot axis; and a container support mounted to the frame on the first side of the axle, the container support being spaced from the handle of the lever arm to define a space to receive the container on the first side of the axle, the container support being pivotable about the pivot axis; the handle being manipulable by a user of the dolly to pivot the support member, the lever arm, and the container support about the pivot axis between at least a storage position and a discharge position, wherein: in the storage position, the container axis has an upright orientation and the ground-engaging element is spaced from the ground surface; and in the discharge position, the container axis has an orientation being substantially parallel to the ground surface, and the ground-engaging element abuts against the ground surface.

B. A method for manipulating a container with a dolly, the method comprising: placing the container on a container support of the dolly disposed between a handle of the dolly and an axle of wheels of the dolly, an axis of the container having an upright orientation; and pivoting the dolly about a pivot axis defined by the axle of the wheels to discharge contents of the container onto a ground surface, the container remaining disposed between the handle and the axle, and the axis of the container having an orientation being substantially parallel to the ground surface.

Each of the embodiments A and B may have one or more of the following additional elements in any combination.

Element 1: the handle is manipulable by the user to pivot the support member, the lever arm, and the container support about the pivot axis to an upright displacement position between the storage and discharge positions, wherein: in the upright displacement position, the container axis has an upright orientation, and the container support is vertically spaced from the ground surface such that the dolly is displaceable along the ground surface with the dolly wheels.

Element 2: the handle is manipulable by the user to pivot the support member, the lever arm, and the container support about the pivot axis to a discharge displacement position, wherein: in the discharge displacement position, the container axis has an orientation being substantially parallel to the ground surface, and the container support is vertically spaced from the ground surface such that the dolly is displaceable along the ground surface with the dolly wheels.

Element 3: in the discharge position, the container support is vertically spaced from the ground surface.

Element 4: a first height of the handle is defined between the ground surface and the handle in the storage position, and a second height of the handle is defined between the ground surface and the handle in the discharge position, the first and second heights of the handle being substantially equal.

Element 5: the handle has a substantially horizontal orientation in the storage position, and the handle has an upright orientation in the discharge position.

Element 6: the lever arm forms an angle with respect to the ground surface in both the storage and discharge positions, the angle being less than or equal to 45°.

Element 7: the angle formed by the lever arm with respect to the ground surface is the same in both the storage and discharge positions.

Element 8: a distance is defined between the axle and the ground surface, the distance being constant in the at least storage and discharge positions.

Element 9: the ground-engaging element includes an adjustable arm being displaceable relative to the support member.

Element 10: further comprising a lever socket mounted to the frame and extending outwardly therefrom on the first side of the axle.

Element 11: the frame has a handle attachment to removably receive a handle of the container.

Element 12: further comprising a container guard rotatably mounted about the axle between the dolly wheels and having flaps extending radially outwardly, the flaps being rotatable about the pivot axis to abut against the container.

Element 13: the support member includes a support arm mounted at one end thereof to the frame and extending to at least one caster wheel at another end of the support arm, wherein: in the storage position, the support arm has an upright orientation and the at least one caster wheel is spaced from the ground surface; and in the discharge position, the support arm has an orientation being substantially parallel to the ground surface, and the at least one caster wheel abuts against the ground surface.

Element 14: in the discharge position, the dolly is displaceable along the ground surface with the dolly wheels and with the at least one caster wheel.

Element 15: the frame includes a spacer block mounted to the support arm adjacent to the axle on the first side thereof.

Element 16: a diameter of the dolly wheels is greater than a diameter of the at least one caster wheel.

Element 17: further comprising an attachment member wrappable about the container to secure the container in the space.

Element 18: a bottom surface of the dolly wheels and a bottom surface of the at least one caster wheel lie in a common plane in the at least storage and discharge positions.

Element 19: the container support has a first end mounted to the frame and extends away therefrom to a second end on the first side of the axle.

Element 20: in the storage position, the second end of the container support abuts against the ground surface and the first end of the container support is vertically spaced from the ground surface.

Element 21: further comprising a trowel support arm and a trowel, the trowel support arm having a first end mounted to the frame and extending to a second end mounted to the trowel, the trowel support arm having an orientation being substantially parallel to the ground surface in the discharge position.

Element 22: pivoting the dolly includes pivoting the dolly to an upright displacement position, wherein the container axis has an upright orientation, and the container support is vertically spaced from the ground surface such that the dolly is displaceable along the ground surface only with the dolly wheels.

Element 23: pivoting the dolly includes pivoting the dolly to a discharge displacement position, wherein the container axis has an orientation being substantially parallel to the ground surface, and the container support is vertically spaced from the ground surface such that the dolly is displaceable along the ground surface with the dolly wheels.

Element 24: placing the container on the container support includes resting at least part of the container support on the ground surface upon the axis of the container having the upright orientation and the dolly being stationary.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A dolly for transporting a container having a container axis along a ground surface, the dolly comprising:
   a frame having an axle extending between at least two dolly wheels being displaceable along the ground surface, the axle defining a pivot axis for the dolly, the frame having a support member with a ground-engaging element spaced apart from the dolly wheels, the support member being pivotable about the pivot axis;
   a lever arm mounted to the frame and extending away therefrom to a handle, the lever arm being positioned on a first side of the axle, the lever arm being pivotable about the pivot axis; and
   a container support mounted to the frame on the first side of the axle, the container support being spaced from the handle of the lever arm to define a space to receive the container on the first side of the axle, the container support being pivotable about the pivot axis;
   the handle being manipulable by a user of the dolly to pivot the support member, the lever arm, and the container support about the pivot axis between at least a storage position and a discharge position, the pivot axis remaining at a constant distance from the ground surface during pivoting between the storage position and the discharge position, wherein:
   in the storage position, the container axis has an upright orientation, part of the container support is located closer from the ground surface than the pivot axis, and the ground-engaging element is spaced from the ground surface;
   in the discharge position, the container axis has an orientation being substantially parallel to the ground surface, the lever arm extends at a higher elevation from the ground surface than the container support, and the ground-engaging element abuts against the ground surface; and
   the container support is located closer to the pivot axis and at a lower evaluation from the ground surface than the handle in the storage position and in the discharge position.

2. The dolly as defined in claim 1, wherein the handle is manipulable by the user to pivot the support member, the lever arm, and the container support about the pivot axis to an upright displacement position between the storage and discharge positions, wherein:
   in the upright displacement position, the container axis has an upright orientation, and the container support is vertically spaced from the ground surface such that the dolly is displaceable along the ground surface with the dolly wheels.

3. The dolly as defined in claim 1, wherein the handle is manipulable by the user to pivot the support member, the lever arm, and the container support about the pivot axis to a discharge displacement position, wherein:
   in the discharge displacement position, the container axis has an orientation being substantially parallel to the ground surface, and the container support is vertically spaced from the ground surface such that the dolly is displaceable along the ground surface with the dolly wheels.

4. The dolly as defined in claim 1, wherein in the discharge position, the container support is vertically spaced from the ground surface.

5. The dolly as defined in claim 1, wherein a first height of the handle is defined between the ground surface and the handle in the storage position, and a second height of the handle is defined between the ground surface and the handle in the discharge position, the first and second heights of the handle being substantially equal.

6. The dolly as defined in claim 1, wherein the lever arm forms an angle with respect to the ground surface in both the storage and discharge positions, the angle being less than or equal to 45°.

7. The dolly as defined in claim 6, wherein the angle formed by the lever arm with respect to the ground surface is the same in both the storage and discharge positions.

8. The dolly as defined in claim 1, wherein a distance is defined between the axle and the ground surface, the distance being constant in the at least storage and discharge positions.

9. The dolly as defined in claim 1, wherein the ground-engaging element includes an adjustable arm being displaceable relative to the support member.

10. The dolly as defined in claim 1, further comprising a lever socket mounted to the frame and extending outwardly therefrom on the first side of the axle.

11. The dolly as defined in claim 1, wherein the support member includes a support arm mounted at one end thereof to the frame and extending to at least one caster wheel at another end of the support arm, wherein:
    in the storage position, the support arm has an upright orientation and the at least one caster wheel is spaced from the ground surface; and
    in the discharge position, the support arm has an orientation being substantially parallel to the ground surface, and the at least one caster wheel abuts against the ground surface.

12. The dolly as defined in claim 11, wherein in the discharge position, the dolly is displaceable along the ground surface with the dolly wheels and with the at least one caster wheel.

13. The dolly as defined in claim 12, wherein a diameter of the dolly wheels is greater than a diameter of the at least one caster wheel.

14. The dolly as defined in claim 12, wherein a bottom surface of the dolly wheels and a bottom surface of the at least one caster wheel lie in a common plane in the at least storage and discharge positions.

15. The dolly as defined in claim 1, wherein the container support has a first end mounted to the frame and extends away therefrom to a second end on the first side of the axle.

16. The dolly as defined in claim 15, wherein in the storage position, the second end of the container support abuts against the ground surface and the first end of the container support is vertically spaced from the ground surface.

17. A method for manipulating a container with a dolly, the method comprising:
    placing the container on a container support of the dolly disposed between a handle of the dolly and an axle of wheels of the dolly, an axis of the container having an upright orientation; and
    pivoting the dolly about a pivot axis defined by the axle of the wheels to discharge contents of the container onto a ground surface, the container remaining disposed between the handle and the axle, and the axis of the container having an orientation being substantially parallel to the ground surface.

18. The method as defined in claim 17, wherein pivoting the dolly includes pivoting the dolly to an upright displacement position, wherein the container axis has an upright orientation, and the container support is vertically spaced from the ground surface such that the dolly is displaceable along the ground surface only with the dolly wheels.

19. The method as defined in claim 17, wherein pivoting the dolly includes pivoting the dolly to a discharge displacement position, wherein the container axis has an orientation being substantially parallel to the ground surface, and the container support is vertically spaced from the ground surface such that the dolly is displaceable along the ground surface with the dolly wheels.

20. The method as defined in claim 17, wherein placing the container on the container support includes resting at least part of the container support on the ground surface upon the axis of the container having the upright orientation and the dolly being stationary.

\* \* \* \* \*